United States Patent [19]

Yano

[11] Patent Number: 5,464,340
[45] Date of Patent: Nov. 7, 1995

[54] EXTRUDER

[75] Inventor: Sadahide Yano, Osakashi, Japan

[73] Assignee: Yugen Kaisha Yano Engineering, Osaka, Japan

[21] Appl. No.: 205,188

[22] Filed: Mar. 3, 1994

[30] Foreign Application Priority Data

Mar. 4, 1993 [JP] Japan .................................. 5-044092

[51] Int. Cl.⁶ .................................................. B21C 29/04
[52] U.S. Cl. ........................ 425/382.3; 425/382.4; 72/262; 72/269
[58] Field of Search .................. 425/382.3, 382.4, 425/461; 164/174, 437, 439, 302; 72/262, 269

[56] References Cited

U.S. PATENT DOCUMENTS

| | | | |
|---|---|---|---|
| 4,053,274 | 10/1977 | Lemelson | 72/269 |
| 4,832,889 | 5/1989 | Johnson | 264/68 |
| 5,052,470 | 10/1991 | Bruxmann | 164/467 |
| 5,167,138 | 12/1992 | Sinha et al. | 72/262 |

FOREIGN PATENT DOCUMENTS

| | | | |
|---|---|---|---|
| 149170 | 10/1902 | Germany. | |
| 492839 | 9/1938 | United Kingdom | 72/262 |
| 649483 | 1/1951 | United Kingdom | 72/262 |
| 681665 | 10/1952 | United Kingdom | 72/269 |
| 1177639 | 1/1970 | United Kingdom. | |
| 2016983 | 9/1979 | United Kingdom | 72/269 |

*Primary Examiner*—Khanh P. Nguyen
*Attorney, Agent, or Firm*—Collard & Roe

[57] ABSTRACT

A core body (60) is disposed in a feed passage (40) in rear of an extrusion die (5), with the passage being provided to transport an extrusile material. One or more annular passageways (63) are formed between the outer periphery of the core body and the inner periphery of the feed passage, so that helical edges (50a, 55a) protrude into the annular passageways. As the helical edges (50a, 55a) are driven to rotate, a strong thrust is applied to the extrusile material (M) within the feed passage (40) towards the extrusion die (5), so that the extrusion pressure is raised to improve the extrudability of various raw materials.

10 Claims, 7 Drawing Sheets

EXTRUDER

BACKGROUND OF THE INVENTION

1. Field of the Invention

The present invention relates to an extruder used to produce extrudates from a metal such as aluminum.

2. Related Art Statement

The prior art extruders for extruding aluminum or the like extrusile metal generally comprise an extrusion die giving a desired shape to the extrudates and a material passage feeding the metal to the die. An extrusion pressure is applied to the softened extrusile metal that is advancing in the passage towards the die, so that the extrudates of the desired shape are produced.

The present applicant has proposed, in its Japanese Patent Applications Nos. Hei.4-339997 and Hei.5-13318, a novel apparatus for continuously extruding a wire-shaped or rod-shaped raw material. However, those previous applications have neither been published yet, nor made known to the public.

As is shown in FIG. 7, this apparatus comprises a die 103 and a container 102 disposed in rear of the die and having a heater 101. The apparatus further comprises a material feeder 104 in rear of the container 102 so as to force the raw material into the container. The wire-shaped or rod-shaped material 'W' of a small diameter will be urged into a passage 102a in the container 102, continuously at room temperature. Thus the extrusion pressure in the passage 102a remains at a proper level. This pressure will force an extrusile material through the die 103 to give an extrudate 'E' of a desired profile, wherein the heater 101 previously heats and softens the material within the container 102.

Operation of such a continuous extruding apparatus is however not necessarily perfect in that, depending on the profile of extrudates, the feeder 104 possibly fails to apply a sufficient pressure to the extrusile material 'M' in the passage 102a.

This problem is not inherent only in the apparatus shown in FIG. 7, but may also occur in the prior art billet extruders wherein a metal billet in the container is forced towards a die. In other words, such a problem will occur in common in a variety of the extruders that comprise a die and a material feed passage in communication therewith.

It is another problem in the extruders exemplified in FIG. 7 that many factors sometimes cause an uneven temperature distribution in the extrusile material within the passage. In such an event, the extrusile material will soften to a variable degree. If a material not heated to completely soften is fed to the die, then an undesirably heavy load charged thereto will break it early.

The apparatus shown in FIG. 7 is designed to continuously force the wire-shaped or rod-shaped raw material into the passage 102a in the container 102. Inaccurate control of the heater 101 in this apparatus will result in an insufficient heating of the material 'W' that is being forced into the passage 102a. This material 'W' not completely softened is likely to break the die 103.

It is also noted that the extrusile material 'M' must be in its properly softened state in the die 103 so as to ensure a good metal flow therethrough. Thus, the material 'M' should be heated to a predetermined temperature before entering the die 103. The extruder in FIG. 7 employs the heater 101 to heat the material 'M' while it is moving forward within the passage 102a. The heater 101 playing the most important role to heat the material will however increase thermal energy consumption and thus raise manufacture cost to a disadvantageous extent.

The same problem will be inherent in the billet extrusion system, because much energy will be consumed to heat the billet.

OBJECTS OF THE INVENTION

An object of the present invention made in view of the problems inherent in prior art extruders is therefore to provide a novel extruder that can apply a sufficient pressure to a raw material in a feed passage so that the a wider range of extrusion conditions may be afforded.

Another object of the invention is to provide an extruder in which a higher pressure is applied to the raw material, and at the same time this raw material is heated to melt uniform before flowing through an extrusion die so that this die is protected from any breakage impairing its durability. This object must be achieved in the invention in such a manner that the necessity of heaters softening the raw material is reduced, diminished or excluded to decrease the energy consumption and lower the equipment and production costs.

It is still another object to provide an extruder in which a wire-shaped or rod-shaped raw material is continuously forced through a material feed passage in such a manner that any unsoftened or insufficiently softened raw material is prevented from reaching the extrusion die, so as to protect the die from any damage which would otherwise impair its durability. Also, this object must be achieved in a manner such that a sufficiently high extrusion pressure is ensured at a lowered energy cost.

Other objects and advantages of the invention will become apparent from the preferred embodiments described below. However, those embodiments do not restrict the scope of the invention but are modifiable without departing from the spirit of the present invention.

SUMMARY OF THE INVENTION

From a first aspect, the present invention provides an extruder comprising: an extrusion die; a feed passage disposed behind the die and guiding a raw material thereinto; and further comprising characteristically at least one pair of blades which each has a helical edge formed at a predetermined lead angle and protruding into the feed passage from an inner periphery thereof, wherein the blades are driven to rotate so as to force the raw material towards the die.

From a second aspect, the present invention provides an extruder comprising: an extrusion die; a feed passage disposed behind the die and guiding a raw material thereinto; and further comprising characteristically a stationary core disposed in an intermediate region of the feed passage so as to define at least one annular passageways around the core and in fluid communication with the feed passage; and at least one pair of blades which each have a helical edge formed at a predetermined lead angle and disposed in the annular passageway, wherein the blades are driven to rotate so as to force the raw material towards the die.

In the extruder provided herein from the second aspect, the helical edges preferably protrude into the annular passageway(s) from an inner periphery of the feed passage.

A plurality of bridges may preferably hold the stationary core in place in the feed passage, wherein the bridges are arranged at angular intervals.

It is preferable that each helical edge is not interposed between any helical valleys, along its entire length.

The blades having the helical edges may preferably protrude from the inner peripheries of short columnar or disc-shaped members. Each blade may be a sintered block of a hard metal powder or the like, and the feed passage extends axially of the columnar or disc-shaped members.

From a third aspect, the present invention provides an extruder comprising: an extrusion die; a feed passage disposed behind the die and guiding a raw material thereinto; a material feeder disposed behind the feed passage so as to force thereinto a wire-shaped or rod-shaped raw material having a cross-sectional area smaller than that of the feed passage; and further comprising characteristically a stationary core disposed in an intermediate region of the feed passage so as to define at least one annular passageways around the core and in fluid communication with the feed passage; and at least one pair of blades which each has a helical edge formed at a predetermined lead angle and disposed in the annular passageway, wherein the blades are driven to rotate so as to force the raw material towards the die.

In the extruder provided herein from the third aspect, the material feeder may preferably comprise a first propeller and a second propeller. Each propeller has on its inner periphery a helical edge formed at a predetermined lead angle and protruding sideways into an upstream passage located behind and continuing to the feed passage. The lead angle is such that the helical edges bite an outer periphery of the elongate raw material advancing through the upstream passage. The first and second propellers are aligned with each other in axial direction of the upstream passage and rotatable therearound, but not displaceable therealong. A drive mechanism further equipped in the extruder drives the first and second propellers to rotate in opposite directions. The helical edges of the propellers are of such pitches that they can force the raw material towards an extrusion container or pressure vessel when the propellers rotate in opposite directions.

In the extruder provided from the third aspect, a heater may preferably surround an intermediate feed passage region between the material feeder and the stationary core.

A further heater may also extend along a downstream feed passage region between the core and the die.

In operation of the extruder provided from the first aspect of the present invention, the blades having the helical edges protruded into the feed passage will rotate to function as screwing members that load a thrust to the raw material towards the extrusion die.

In operation of the extruder provided from the second aspect, the stationary core disposed in the intermediate region of the feed passage will change a solid flow of the raw material. In detail, the material which has been the solid unhollow flow upstream of the core will become an annular flow when passing by the core. The raw material will assume again the solid flow downstream of the stationary core. Such changes from the solid flow to the annular flow, and vice versa, are effective to stir the raw material. Thus, the temperature distribution thereof within the feed passage will become uniform before reaching the die, thereby softening the material in a uniform manner. The friction between the material surface and the core surface, as well as the internal friction within the deforming material, will generate a considerable amount of heat to raise the temperature thereof.

Also in the extruder from the second aspect, the helical edges protruding into the annular passageways to form parts of the feed passage will impart to the raw material a strong extrusion thrust.

The combination of the core with the rotating helical edges will render this extruder advantageous further in that the cross-sectional area of each helical edge is significantly larger than the annular passageways formed between the core's outer periphery and the passage's inner periphery. Thus, the rotation of the edges will produce an extremely strong thrust to force the raw material forwards, and the stirring and frictional heating thereof will take place more effectively to soften it.

The extruder provided from the third aspect will surely make harmless the wire-shaped or rod-shaped raw material, even if it enters the feed passage before completely softened. This is because the stationary core and the rotating helical edges will rub and knead the raw material to soften uniform before reaching the extrusion die. Thus, such an unsoftened or partially softened raw material will never charge any undesirable strong stress to the die.

DETAILED DESCRIPTION OF THE PREFERRED EMBODIMENTS

Now the preferred embodiments of the present invention will be described in detail referring to an extruder adapted for use to produce aluminum extrudates.

Figure 1:
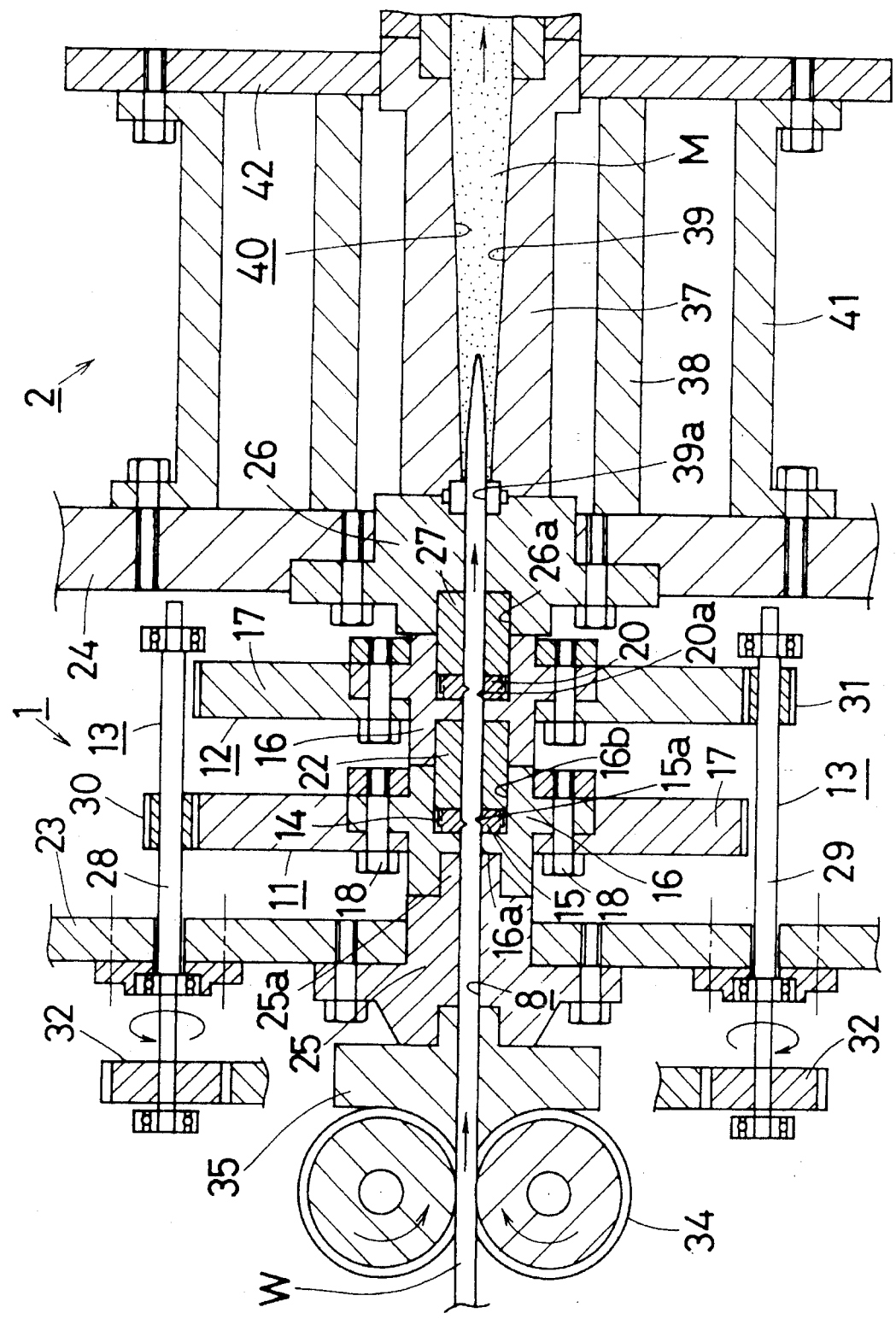
FIG. 1 is a cross section of an extruder provided in accordance with a first embodiment, and showing its part located upstream of and along the extrusion direction of a raw material.
Figure 2:
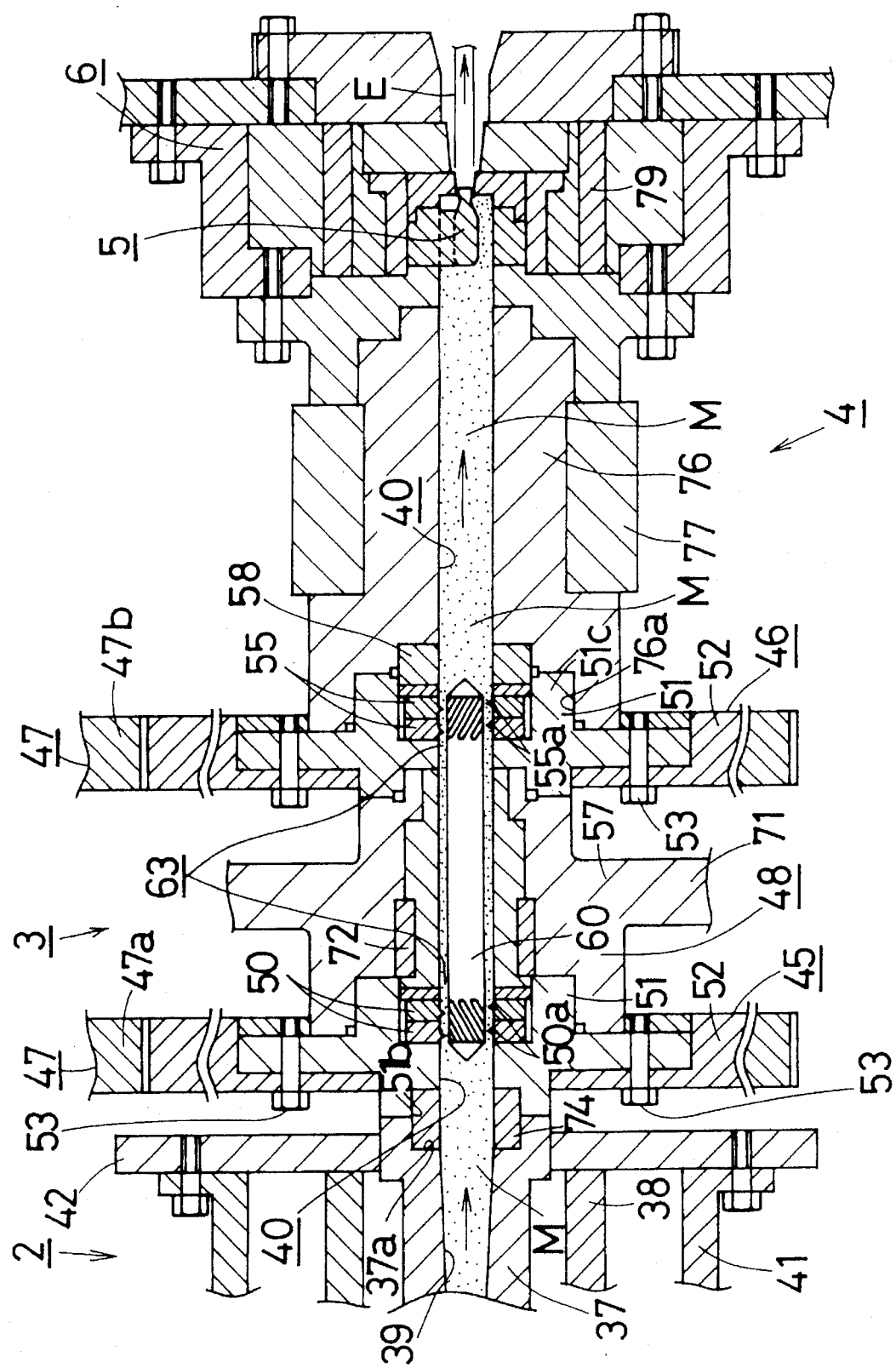
FIG. 2 similarly is a cross section of a downstream part of the extruder.

FIGS. 1 and 2 show an extruder provided according to a first embodiment. The reference numerals 1, 2, 3, 4, 5 and 6 respectively denote: a material feeder; a first container; a supplementary compressor; a second container; an extrusion die; and a die holder.

The material feeder 1 is of such a structure that a wire- or rod-shaped raw material 'W' is forced into an upstream end of the first container 2. An extrusile material 'M' therein will be compressed by the feeder 1 up to an extrusion pressure. The reference numeral 8 denotes an upstream passage through which the raw material advances forward.

FIG. 1 shows that the material feeder 1 comprises a first propeller 11, a second propeller 12 and a drive mechanism The first propeller 11 is a combination of a blade 15 with a blade holder 16 having an outer periphery secured to a gear 17.

Figure 3A:
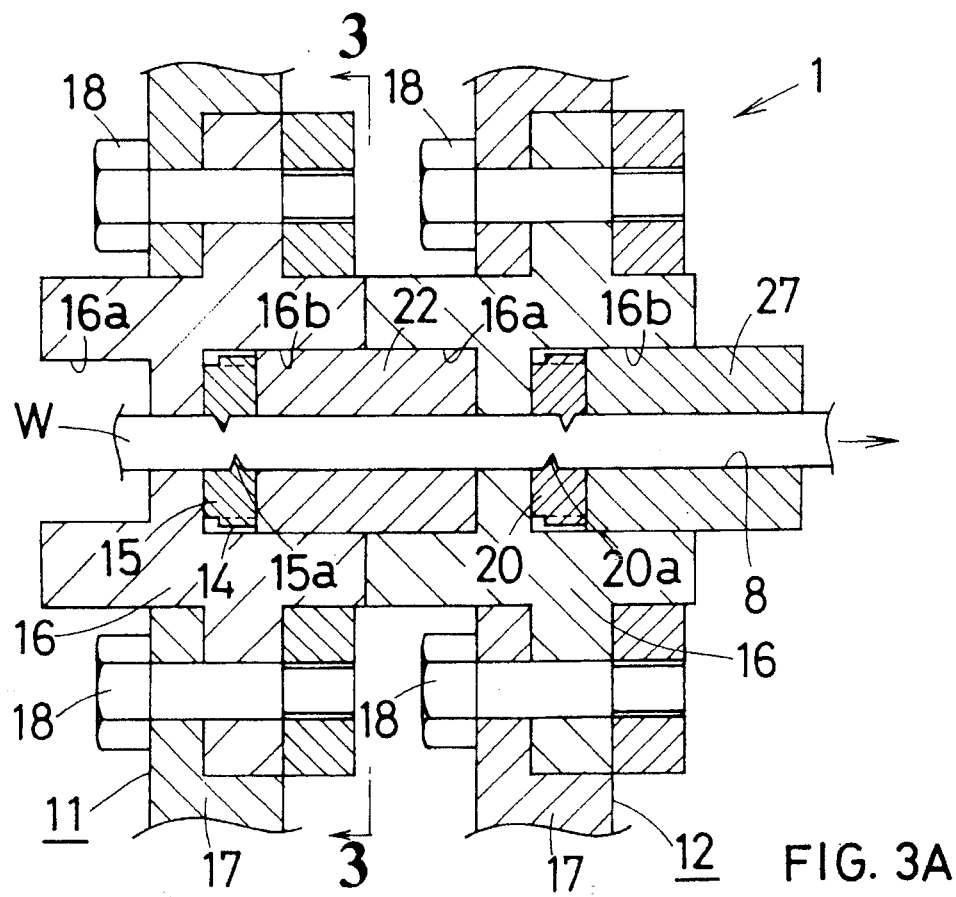
FIG. 3A is an enlarged cross section of a material feeder equipped in the extruder so as to supply it with a raw material.
Figure 3B:
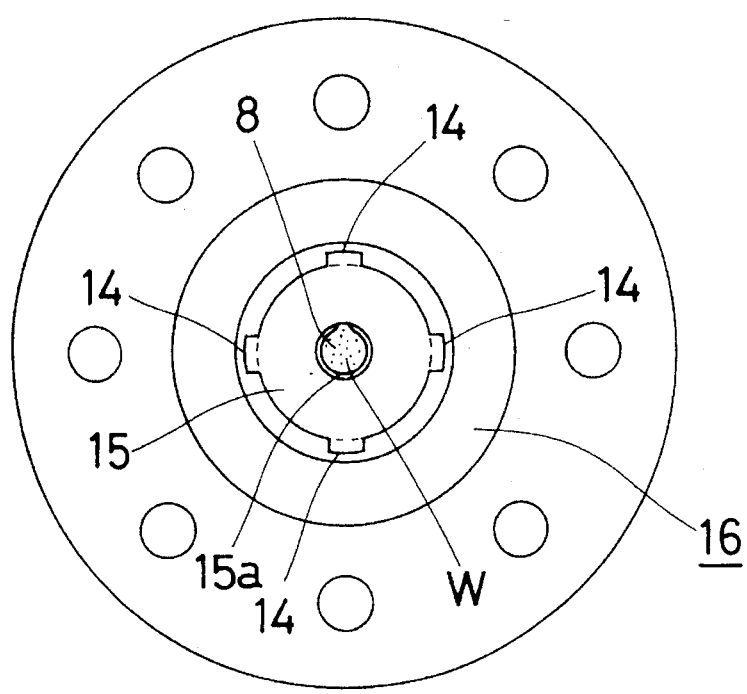
FIG. 3B is a side elevation of a blade in the feeder, seen from the line 3—3 in FIG. 3A.

FIGS. 3A and 3B show that the blade 15 is a short columnar or disc member defining axially thereof a part of the upstream passage 8. A helical edge 15a formed integral with the inner periphery of blade extends spirally at a predetermined lead angle and is ridge-shaped in cross section.

The ridge-shaped helical edge 15a protrudes radially of and into the upstream passage 8 so as to bite the outer periphery of the material 'W' traveling therethrough.

The helical edge 15a is slightly shorter than a circle as shown in FIG. 3B so that the blade may not rotate in unison with the raw material.

Both the circumferential end portions of the edge 15a are inclined to become lower towards its extremities so that the edge can easily bite and smoothly remove from the outer periphery of the raw material 'W'.

The blade may preferably be a sintered piece of a hard metal powder or the like, because the edge 15a is of the specific shape slightly shorter than one circle. The sintering of metal powder is advantageous in that the edge can be formed easily and precisely at a lower cost.

The blade 15 may be of a composite structure consisting of a basal portion and the helical edge 15a, wherein the former is made of any ordinary metal and the latter is made of the hard metal. The edge may include a portion closely adjacent thereto, and a ceramics or the like may be used in place of the hard metal to manufacture the blade.

Similarly to the blade 15, the blade holder 16 is made of a hard metal, a ceramics or the like hard material. This holder 16 has a rear and front axial bores 16a and 16b for slidably receiving adjacent members, respectively. The blade 15 fits in the front bore 16b and rests on a bottom thereof. Keys 14 fix the blade 15 to the blade holder 16, to be rotatable in unison therewith.

Bolts 18 secure the holder 16 to a disc-shaped gear 17 located outside the holder.

FIG. 3A further shows the second propeller 12 likewise having a blade 20. A helical edge 20a of this blade 20 extends in a direction opposite to the helical edge 15a in the first propeller 11. Other elements including a blade holder 16 and a gear 17 in the second propeller 12 are the same as those in the first one, and therefore description is abbreviated.

The first and second propellers 11 and 12 are built in the extruder in the following manner.

A smoothly slidable collar 22 fitted on one hand in the holder's front bore 16b in the first propeller 11 does fit on the other hand in a rear bore 16a of the holder 16 in the second propeller, thereby connecting the former to the latter in a bridging manner.

Returning to FIG. 1, a rear wall 23 holding a bearing 25 is spaced from and confronts a front wall 24 which also holds a bearing 26. A front lug 25a of the rear bearing 25 fits in the rear bore 16a of the rear holder 16, so that the rear bearing 25 rotatably supports the first propeller 11.

A smoothly slidable collar 27 fitted on one hand in the holder's front bore 16b in the second propeller 12 does fit in a rear recess 26a of the front bearing 26 on the other hand, thereby connecting them in a bridging manner. Thus, the front bearing 26 rotatably supports the second propeller 12.

Due to the described connection structure, the first and second propellers 11 and 12 held between the rear and front walls 23 and 24 are rotatable independently of each other.

The drive mechanism 13 comprises a pair of first and second shafts 28 and 29 located outside the propellers 11 and 12. Those shafts 28 and 29 extend in parallel with one another and with the extrusion direction, to pass the propellers. A first pinion 30 fixed on the first shaft 28 is in mesh with the gear 17 in the first propeller 11, and a second pinion 31 on the second shaft 29 is similarly in mesh with the corresponding gear 17 in the first propeller 12. A prime mover such as an electric motor will drive input pinions 32 secured to the shafts 28 and 29, in opposite directions. Due to the driving force transmitted through the shafts 28 and 29 and the first and second pinions 30 and 31, the first propeller 11 will rotate in normal direction while the second propeller 12 rotating in reverse direction.

Since the propellers rotate in opposite directions and the helical edges 15a and 20a driven thereby are formed in opposite spiral directions, the raw material 'W' is protected from torsion or any undesirable deformation which would hinder the material from continuously and smoothly advancing towards the first container 2.

The reference numerals 34 and 35 denote a pair of feeding rolls and a guide, respectively.

The first container 2 continuously receives the raw material 'W' urged thereto by the feeder 1, and converts the raw material into an extrusile material 'M' of an increased diametrical dimension. The extrusile material 'M' in the first container 2 will be softened to an optimal degree to be compressed most efficiently within the supplementary compressor 3, which produces an extrusion pressure as will be described later.

The first container 2 shown in FIG. 1 comprises a container body 37 and a heater 38.

The container body 37 is a cylinder made for example from a high-tensile heat-resisting steel or a ceramics compatible therewith. A compressing bore 39 extending axially of the body 37 is tapered towards a downstream end thereof. An upstream end of the compressing bore is an entrance 39a fitting on the wire- or rod-shaped raw material 'W'. An inner region located ahead of this entrance 39a is a rear zone of feed passage 40. This feed passage 40 is of a cross-sectional area significantly larger than the material 'W'.

The heater 38 surrounds the container body 37 so as to heat the extrusile material 'M' in the compressing bore 39. The numeral 41 denotes a housing.

With the heater 38 in the first container 2 being turned on, the raw material 'W' being forced into the bore 39 through the entrance 39a will be heated to reduce its resistance to deformation. The raw material 'W' thus successively heated will become softened to the same degree as the extrusile material 'M', so that the former melts into and becomes integral with the latter. The said softened state of the material 'M' is such that the supplementary compressor 3 can most effectively apply thereto a sufficiently strong extrusion pressure.

An intermediate wall 42 is spaced a distance from and disposed in front of the front wall 24 of the feeder. A rear end of the container body 37 secured between these walls bears against the bearing 26 in the wall 24, with a front end of said body penetrating the other wall 42.

The supplementary compressor 3 serves to increase the extrusion pressure which will have been produced by the feeder 1 forcing the raw material 'W' into the feed passage through the tight entrance. In detail, the extrusile material 'M' present in the feed passage 40 extending between the die 5 and the bore 39 in the first container 2 will be urged more strongly towards the die.

FIG. 2 shows the supplementary compressor 3 comprising a first rotor 45, a second rotor 46, a core unit 48 and an additional drive mechanism.

The first rotor 45 is a combination of two blades 50 with a blade holder 51 carrying them and a gear 52 fixed on and around the holder 51.

Figure 4:
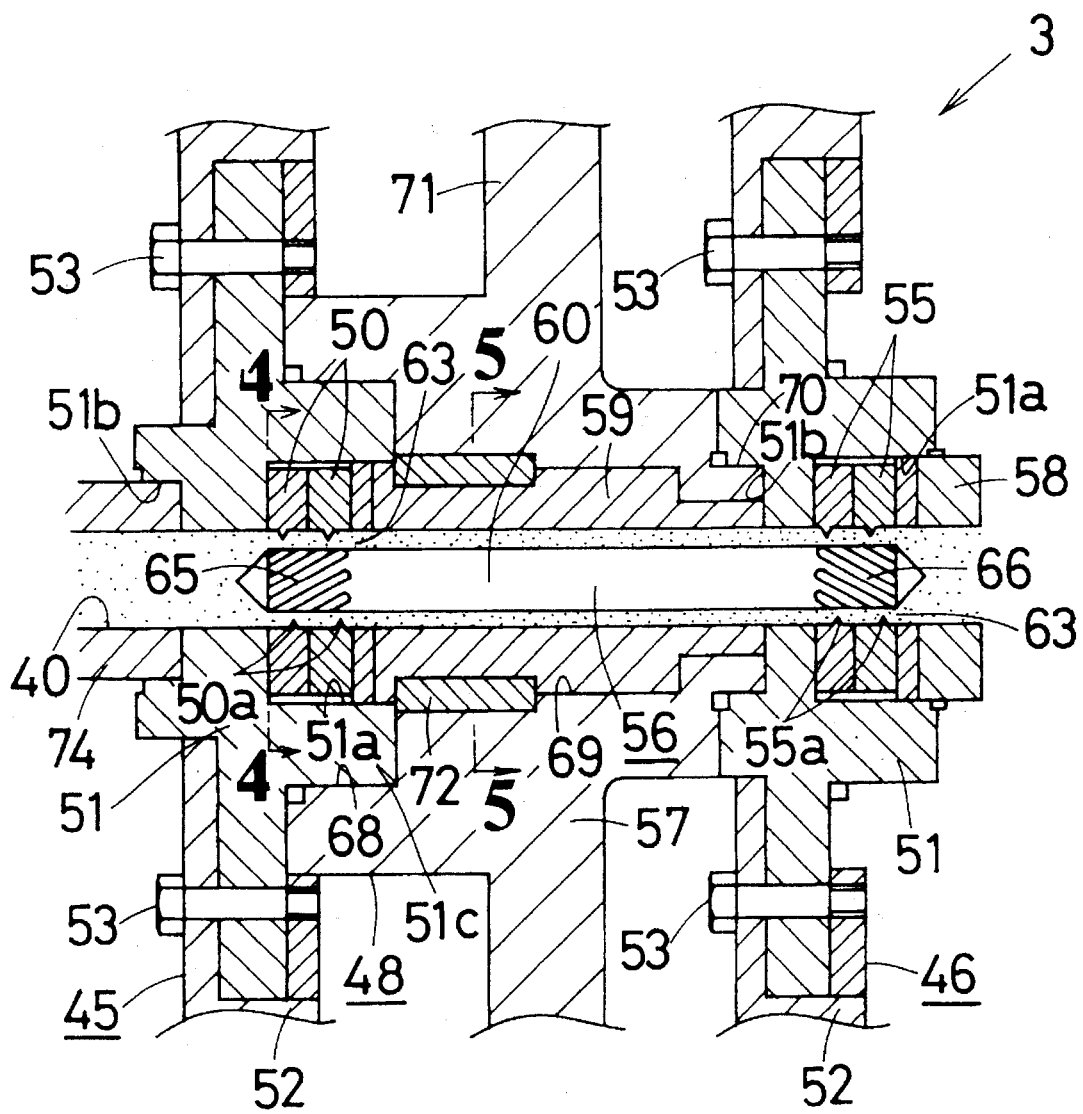
FIG. 4 is an enlarged cross section of a supplementary compressor equipped in the extruder so as to compress the raw material.

FIG. 4 shows that each blade 50 is a short columnar or disc member defining axially thereof a part of the feed passage 40. Two helical edges 50 are formed integral with the inner periphery of blade. Those edges extend spirally at a predetermined lead angle and are ridge-shaped in cross section.

The ridge-shaped helical edges 50a protrude radially of and into the feed passage 40 so as to bite the outer periphery of the extrusile material 'M' traveling through said passage.

Figure 5A:
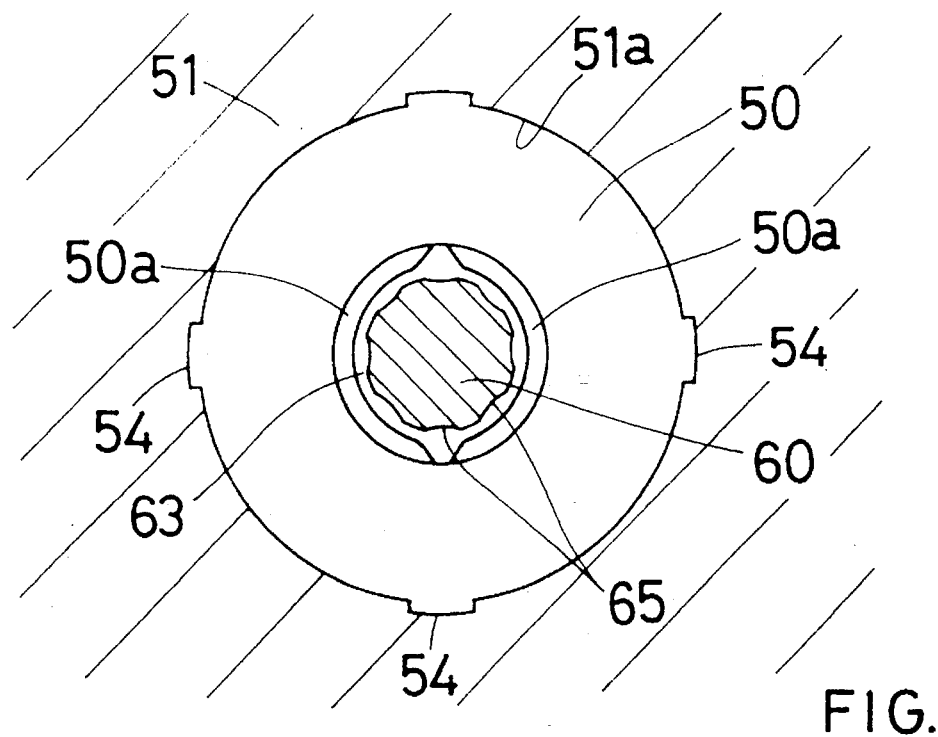
FIG. 5A is a cross section taken along the line 4—4 in FIG. 4.
Figure 5B:
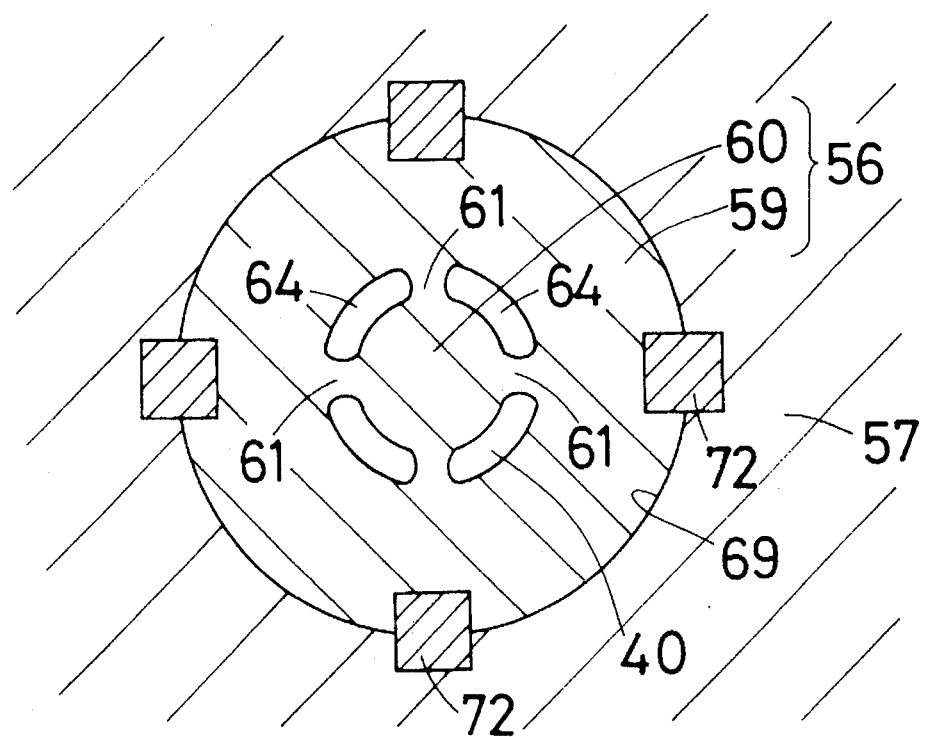
FIG. 5B also is a cross section taken along the line 5—5 in FIG. 4.

Each helical edge 50a is slightly shorter than a semicircle as shown in FIG. 5A so that the extrusile material will not rotate in unison with the blade to render difficult the transportation of said material. The two edges 50a of each blade are arranged at an angular shift of 180°, but extend in the same spiral direction.

Both the circumferential end portions of each edge 50a are inclined to become lower towards extremities such that the edge can easily bite and smoothly remove from the outer periphery of extrusile material 'M'.

All the helical edges 50a of the blades 50 extend in the same spiral direction.

Due to the specific shape of the edges 50a arranged at angular shift of 180° and each slightly shorter than semicircle, each blade 50 may preferably be a molded and sintered piece of a metal powder such as a hard metal powder. The sintering of the metal powder is advantageous in that the edge can be formed easily and precisely at a lower cost.

Each blade 50 may be of a composite structure consisting of a basal portion and the helical edge 50a, wherein the former is made of any ordinary metal and the latter is made of the hard metal and possibly includes a portion closely adjacent to the edge. A ceramics or the like hard material may substitute for the hard metal to manufacture the blades.

Similarly to the blades, the blade holders 51 are also made of a hard metal, a ceramics or the like hard material. Each holder 51 has a front axial bore 51a. The blades 50 arranged in series and side by side do fit in the front bore and rest on a bottom thereof as shown in FIG. 4. Keys 54 fix the blades 50 to the blade holder 51, to carry them rotatable in unison therewith as shown in FIG. 5A.

Bolts 53 secure the holder 51 to a disc-shaped gear 52 located therearound.

The second rotor 46 also comprises blades 55 each having helical edges 55a. These edges 55a extend in a spiral direction opposite to that in which the helical edges 50a extend in the first rotor 45. However, other elements including a blade holder 51 and a gear 52 in the second rotor 46 are the same as those in the first one 45.

The helical edges 55a in the second rotor may alternatively be formed in the same spiral direction as those 50a in the first rotor 45.

The core unit 48 comprises a stationary core 56 and a core holder 57.

The stationary core 56 substantially consists of a shell 59, a core body 60 and bridges 61 located between them. The shell 59 is in alignment with the feed passage 40, and has an axial opening as a part of the passage. The core body 60 accommodated in the axial opening extends coaxially with the shell 59, and is of a length such that its forward and rearward extensions respectively protrude from a front and rear ends of the shell. The bridges 61 arranged at regular and angular intervals around the core body 60 secure the shell 59 to this body 60. Therefore, annular passageways 63 are formed each between the inner periphery of feed passage 40 and an outer periphery of the forward or rearward extension of the core body 60. Further, a plurality of port-holes 64 are provided between the inner periphery of shell 59 and the outer periphery of a middle portion of the body 60. Those port-holes 64, which extend longitudinally of and at regular and angular intervals around the core body 60, are separated one from another by the bridges 61.

Helical grooves 65 and 66 are formed in the outer peripheries of the core body extensions, and extend in opposite spiral directions. A lead angle of grooves 65 and 66 is significantly larger than that of helical edges 50a and 55a. The helical grooves 65 may extend instead in the same spiral direction as the other helical grooves 66.

On the other hand, the core holder 57 has a stepped axial bore, as shown in FIG. 4. Inner peripheral steps of this bore through the holder 57 decrease their diameter towards the extrusion die. Thus, a rearmost large diameter recess 68, an middle cylindrical portion 69 of an intermediate diameter, and a foremost small diameter portion as a lug are provided to constitute the core holder 57. The recess 68 is engageable with an adjacent member rotatable relative to the core holder, with the middle portion 69 firmly holding a further adjacent member. A wall 71 is integral with the core holder 57.

The shell 59 of the stationary core 56 fits, as the further adjacent member, in the middle cylindrical portion 69 of the holder 57. Keys 72 placed between the shell 59 and said portion 69 inhibit the latter from rotating.

The first and second rotors 45 and 46 and the core unit 48 are equipped in the extruder in the following manner.

The first rotor 45 has a rear recess 51b as shown in FIG. 2. A slidable metal collar 74 fits in this rear recess 51b and in a front recess 37a of the container body 37 in the first container 2, so that the first rotor 45 is rotatable in situ.

A front lug 51c of the first rotor 45, as the first mentioned adjacent member, fits in the rearmost recess 68 of the holder. The first rotor is thus rotatably held in place at its front end by the core unit 48, as shown in FIG. 4.

The front lug 70 of the core holder 57 fits in a rear recess 51b of the second rotor 46, which is thus kept rotatable at its rear end by the core unit 48.

A front lug 51c of the second rotor 46 shown in FIG. 2 fits in a rear recess 76a of the second container 4, and is supported at its front end to be rotatable relative thereto.

As seen in FIG. 4, the helical edges 50a of the blades 50 in the first rotor 45 confront the rear extension of the core body 60, and are located close to the helical grooves 65 on said extension. Similarly, the helical edges 55a of the blades 55 in second rotor 46 confront the front extension of the core body 60 and are close to the helical grooves 66 on said extension.

The thus installed core body 60 has its helical grooves 65 and 66 to extend in the same spiral direction as the helical edges 50a and 55a of the first and second rotors 45 and 46, respectively.

The additional drive mechanism 47 shown in FIG. 2 comprises a first and second pinions 47a and 47b that are respectively in engagement with the gears 52 of the first and second rotors 45 and 46. A prime mover not shown will drive those pinions and cause the two rotors to rotate in opposite directions.

The extrusile material 'M' will be urged towards the second container 4, as the first and second rotors 45 and 46 rotate in opposite directions and the their helical edges 50a and 55a also extend in opposite spiral directions.

The second container 4, which receives the extrusile material 'M' from the supplementary compressor 3, contributes to optimize the extrusion temperature of the extrusile material 'M'.

The second container 4 comprises a container body 76 surrounded by a variably controllable heater 77. The container body has an axial bore serving as a downstream region of the feed passage 40. A slidable metal collar 58 connects the second rotor 46 in supplementary compressor 3 to a rear end of the second container, whose front end fits in turn in a rear end of the die holder 6. The container body 76 is made for example of a high-tensile heat-resisting steel or a ceramics of a property compatible therewith.

The extrusion die 5 may be composite and consist of a male die and a female die, such as those in a port-hole die for producing hollow extrudates. A heater 79 around the die holder 6 will heat the extrusion die.

Now, operation of the extruder in the first embodiment will be summarized below.

An elongate raw material such as a wire-shaped or rod-shaped material may be subjected to the extrusion process. The raw material may be any aluminum alloy such as those included in the A-1000, A-2000, A-3000, A-5000 and A-6000 series, or any other extrusive metallic material.

The cross-sectional dimension of the raw material 'W' is an important factor in operation. For a continuous extrusion thereof, the material 'W' had better be wound compact to form a roll and smoothly drawn therefrom into the first container 2. In other words, the raw material 'W' preferably serves as a continuous plunger. The raw material 'W' is not necessarily of a round profile but of any other irregular configuration. A preferable example is a round aluminum rod about 10 mm in diameter.

The feed passage 40 extends through both the first and second containers 2 and 4 and through the supplementary compressor 3 interposed therebetween.

In operation, such a feed passage 40 and the die 5 must be filled at first with the extrusile material 'M' which is substantially the same as the raw material 'W'.

The raw material 'W' rigid at or above room temperature will subsequently be put into the feeder 1 through the rollers 34, before starting to run the extruder.

The drive mechanisms 13 and 47 for the feeder 1 and the supplementary compressor 3 will then be turned on, when a proper time will have passed after the heaters 79 in die holder 6 as well as the other heaters 38 and 77 in first and second containers 2 and 4 are activated.

As the extruder comes into its normal operation state, the rotating helical edges 15a and 20a in first and second propeller will bite the outer periphery of raw material 'W' that is being forced by the rollers 34 into the upstream passage 8. Thus, the material 'W' will be urged into the compressing bore 39 in first container 2.

Such a screwing of the material 'W' into the compressing bore 39 will generate a sufficient extrusion pressure therein.

The first and second propellers 11 and 12 rotating in opposite directions will prevent a friction between the material 'W' and blades 15 and 20 from causing any intolerable torsion of said material, whereby it can be fed smooth into the compressing bore 39.

The material 'W' will be heated due to friction between it and the helical edges 15a and 20a, but to such a temperature as allowing the material to remain solid in the feeder 1. Thus, thermal energy consumption of the heater 38 in the first container 2 is saved to a notable extent.

The raw material 'W' will be pressed into compressing bore 39 in the container body 37 through the entrance 39a, by a distance such that said material will remain solid. As the material 'W' further advances forwards, not only the heat emitted from the heater 38 but also the friction between the two materials 'W' and 'M' as well as the heat of the latter material 'M' will reduce the former material's resistance to deform. As a result, the former material 'W' will soften to the same degree as the latter material 'M' and become integral therewith, as if molting thereinto.

The forcible supplying of rod- or wire-shaped raw material 'W' into the compressing bore 39 in first container 2 will raise the pressure therein. Consequently, the extrusile material 'M' in said bore 39 will be urged towards the compressor 3. The raw material 'W' works in this manner as a continuous plunger always operating in one direction.

The raw material 'W' of a smaller cross-sectional size becomes in this manner the extrusile material 'M' of a larger cross-sectional size to be extruded through the extrusion die.

One important role which the heater 38 plays is the heating of the extrusile material 'M' in first container 2 to such a temperature that the supplementary compressor 3 can reliably raise the material pressure. Therefore, the heater 38 has to be controlled to ensure this effect.

If the extrusile material 'M' is excessively softened in the first container 2, then the rotors 45 and 46 and the core unit 48 in the compressor 3 will fail to generate a sufficient thrust for the material. If contrarily the material 'M' is scarcely softened, then it will not smoothly be driven forward but will an overload to the compressor. The operating condition of heater 38 will have to be experimentally established case by case, depending on the kind of material 'W' or 'M' and taking into account other relevant factors.

A 'solid' (i.e., not hollow) flow of the softened extrusile material 'M' is thus delivered from the first container 2 to the supplementary compressor 3. Because the stationary core, and more particularly its body 60, defines the annular passageways 63 between it and the inner periphery of feed passage 40, the solid flow of softened material 'M' will become a hollow or cylindrical flow. This material 'M' will subsequently advance beyond the stationary core to assume again a 'solid' flow, before entering the second container 4.

The helical edges 50a and 55a on the rotating first and second rotors 45 and 46 in the compressor will screw the material 'M' out of the annular passageways 63, thereby additionally raising the extrusion pressure.

There is a possibility that the raw material 'W' is not completely softened yet when leaving the first container 2. Such a partially softened material will however collide with the core body 60 and the bridges 61 so that the solid flow of said material becomes cylindrical and divided into tributaries. Due to such a disturbed flow, the material will be completely softened there, before extruded through the die. Any unsoftened material portion inevitable in the prior art extruders lacking the core will now be inhibited from colliding with the expensive die 5. Thus, the extrusion die 5 is now protected well from any breakage or damage that undesirably raises production cost.

The core body 60 supported by bridges 61 will generate a frictional heat and additionally soften the material 'M', thereby reducing the energy consumption of the heater 38.

A propelling force, which the protruding helical edges 50a and 55a of first and second rotors apply to the cylindrical flow of material 'M', will intensively stir and thrust it forwardly of the annular passageways 63 around core body 60. Thus, the possibility that any unsoftened flow of material would damage the die will be avoided more effectively. The edges 50a and 55a will generate additional frictional heat to further reduce the energy consumption of the heater 38.

The helical grooves 65 and 66 formed on the front and rear extensions of core body 60 confront and cooperate with the helical edges 50a and 55a. The lead angle of those grooves greater than that of the edges is effective to force the material 'M' forwards and increase the extrusion pressure.

The members that protrude into the annular passageways 63 as parts of the feed passage 40 for the extrusile material 'M' are only the edges 50a and 55a. Any drive mechanism or its portion installed for the edges does not jut into said passageways 63. Therefore, the passage 40 need not be L-shaped or otherwise modified, and the present extruder is rendered much simpler in its structure. Such a straight passage and passageways are also advantageous to smoothly propel the extrusile material.

The heater 77 in the second container 4 will heat the material 'M' received therein so as to render it optimally softened for the extrusion process.

The material 'M' thus softened in the second container 4 will then be forced through the die 5, to produce extrudates 'E' of a desired profile.

The two containers 2 and 4 installed in combination are intended to play different roles. The first one 2 softens the material 'M' to such a degree that the compressor 3 can properly compress it, whereas the second one 4 further softens the material to be smoothly extruded through the die 5. Thus, both the compression and extrusion are effected herein under optimal conditions.

Figure 6:
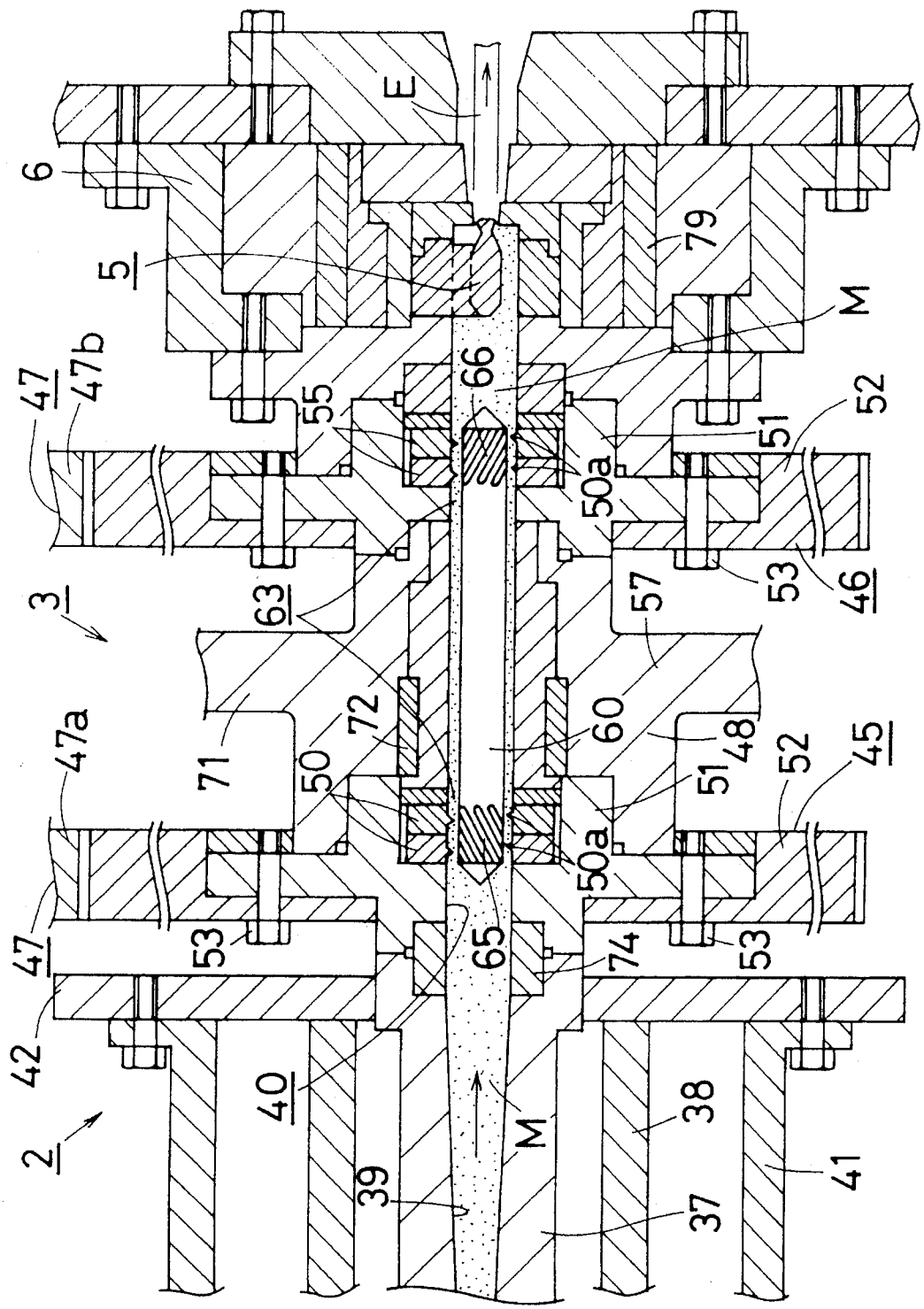
FIG. 6 is a cross section of another extruder provided in a second embodiment, and showing its part located downstream of and along the extrusion direction of a raw material.
Figure 7:
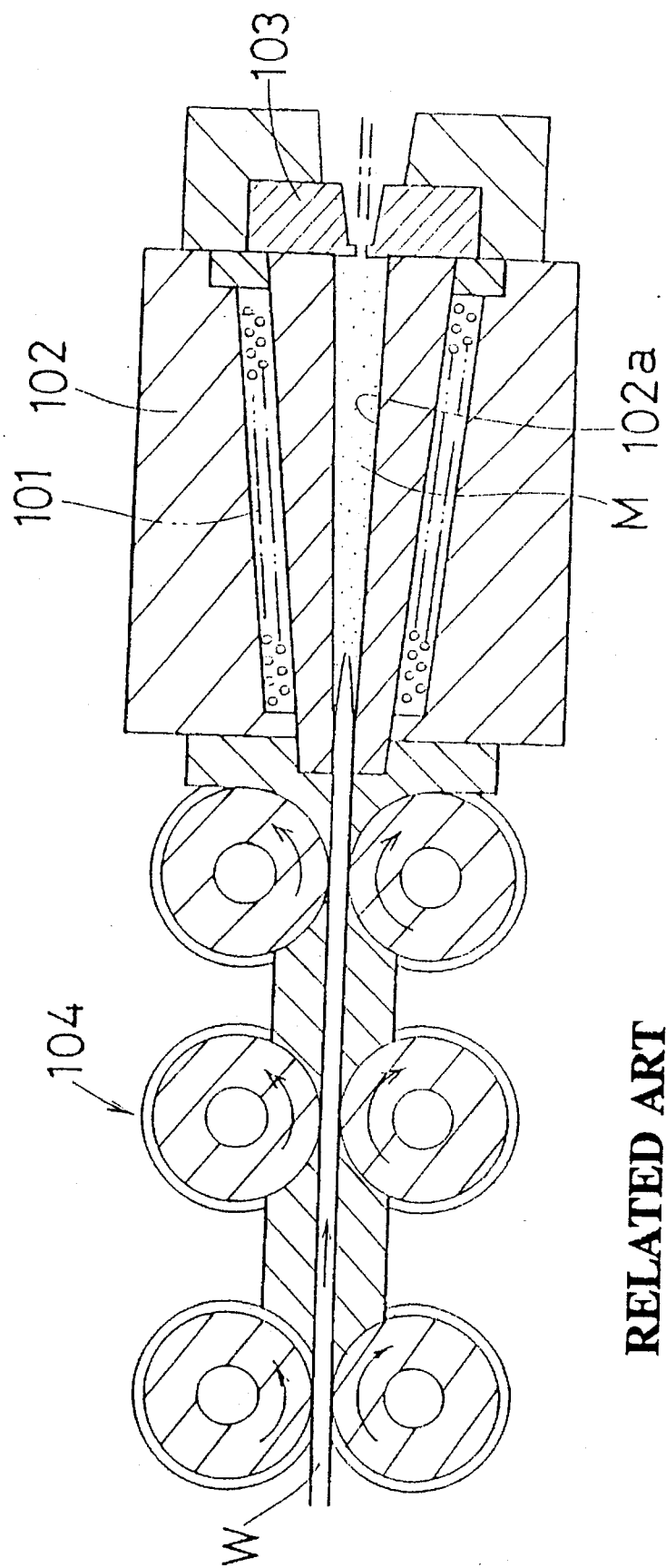
FIG. 7 is a cross section of still another extruder that has been proposed by the present applicant but not yet made known to the public at the time of the present application.

FIG. 6 shows a second embodiment providing an extruder deficient in the second container 4 included in the first embodiment. This container 4 is dispensed with because the softened state for compression of said material 'M' in the compressor 3 does sometimes and somewhat overlap the other state for extrusion thereof through the extrusion die 5. Other features of the extruder in the second embodiment are the same as those in the first embodiment, so that description of them is abbreviated.

Although the heater 38 around the first container preheats and softens the material 'M' before delivering it to the compressor 3 in the described embodiments, it may be possible to dispense with that heater. In such a case, a rear end of the core body 60 will be located near the outlet of feeder 1 to be accommodated in a flared passage of a certain length. Thus, the softened material will directly transfer to the annular passageways 63 around the core body, without being previously heated by any heater. The rubbing or slipping friction occurring between the core body 60 and material 'M' or occurring between it and the blades 50 and 55, as well as the internal friction in the deforming material 'M', will be useful in this case to heat it to a sufficient degree.

The supplementary compressor 3 assists the feeder 1 to further raise the extrusion pressure in the described embodiments. However, any propelling mechanism comprising the helical edges 50a and 55a alone or in combination with the core body 60 may operate as a principal compressor.

Both the described embodiments provide an extruder adapted for extrusion of a wire-shaped or rod-shaped raw material 'W'. However, the present invention is also applicable from its first or second aspect to any other extruders such as a batch-wise billet extruder that comprises a die and an adjacent feed passage delivering thereto a raw material.

In summary, and from the first aspect of invention, the rotatable helical edges jutting into the feed passage do screw the raw material out of the passage and impart to the material a sufficient extrusion pressure. They may be combined with a stem or the like member in billet extruders, or combined with a forcible raw feeder in the continuous extruders in order to increase the extrusion pressure and expand the applicability of extrusion process. Even in cases wherein no space is reserved to install a full compressor in rear of the material feeder, or consequently no compressor is installed there, the apparatus proposed herein can be employed to produce a sufficient extrusion pressure for the raw material within the passage.

The extruder proposed from the second aspect of the invention comprises the core in the middle region of the feed passage. This stationary core causes the raw material flow of a 'solid' columnar shape to change into an annular or the like shape and again into the solid shape. Such a stirring by the core is useful to make the temperature even throughout the material, thereby softening it uniform to protect the die from damage and improve its durability.

The forced deformation of the material as well as the frictional contact thereof with the core are effective to raise the temperature of the material. Thus, the extruder can be constructed or operated with no or only weak heaters. Heat energy consumption decreases, and equipment and operation costs are also lowered.

In addition, the helical edges employed in combination with the core can be of a wide cross-sectional area as compared with the annular passageways defined between the outer periphery of core and the inner periphery of feed passage. This is useful to generate an extremely strong thrust applied to the extrusile material.

Besides, the helical edges stir and heat the material more efficiently, due to frictional contact therewith. The effect of protecting the die and reducing the costs will be improved further.

The extruder provided herein from the third aspect for continuous extrusion of a wire-shaped or rod-shaped material that are guided through a feed passage does employ the stationary core in combination with the edges. Therefore, the die is now protected well from damage or early breakage that have been caused by the unsoftened or not thoroughly softened material in the passage in the prior art extruders. The advantages in heat energy consumption and high extrusion pressure are also afforded similarly to the extruders provided herein from the first or second aspect.

What is claimed is:

1. An extruder comprising:

an extrusion die;

a feed passage disposed behind the die and guiding a raw material thereinto; and at least one pair of blades which each has a helical edge formed at a predetermined lead angle and protruding into the feed passage from an inner periphery thereof, wherein the blades are driven to rotate so as to force the raw material towards the die.

2. An extruder comprising:

an extrusion die;

a feed passage disposed behind the die and guiding a raw material thereinto;

a stationary core disposed in an intermediate region of the feed passage so as to define at least one annular passageway around the core and in fluid communication with the feed passage; and at least one pair of blades which each have a helical edge formed at a predetermined lead angle and disposed in the at least one annular passageway, wherein the blades are driven to rotate so as to force the raw material towards the die.

3. An extruder as defined in claim 2, wherein the helical edges protrude into the annular passageway(s) from an inner periphery of the feed passage.

4. An extruder as defined in claim 2, wherein the stationary core is fixedly held in the feed passage by a plurality of bridges that are arranged at angular intervals.

5. An extruder as defined in claim 2, wherein each helical edge is not interposed between any helical valleys, along its entire length.

6. An extruder as defined in claim 2, wherein the blades each having the helical edge are columnar or disc-shaped blocks disposed on inner peripheries of short columnar or disc-shaped members, the blocks being sintered blocks of a powder of a hard metal or the like.

7. An extruder comprising:

an extrusion die;

a feed passage disposed behind the die and guiding a raw material thereinto;

a material feeder disposed behind the feed passage so as to force thereinto a wire-shaped or rod-shaped raw material having a cross-sectional area smaller than that of the feed passage;

a stationary core disposed in an intermediate region of the feed passage so as to define at least one annular passageways around the core and in fluid communication with the feed passage; and at least one pair of blades which each has a helical edge formed at a predetermined lead angle and disposed in the annular passageway, wherein the blades are driven to rotate so as to force the raw material towards the die.

8. An extruder as defined in claim 7, further comprising a first propeller and a second propeller;

each propeller having on its inner periphery a second helical edge formed at a second predetermined lead angle and protruding sideways into an upstream passage located behind and continuing to the feed passage;

the second lead angle being such that the helical edges bite an outer periphery of the elongate raw material advancing through the upstream passage;

the first and second propellers being aligned with each other in axial direction of the upstream passage and rotatable therearound, but not displaceable therealong;

a drive mechanism further equipped in the extruder drives the first and second propellers to rotate in opposite directions; and the second helical edges of the propellers are of such pitches that they force the raw material towards an extrusion container or pressure vessel as the propellers rotate in the opposite directions.

9. An extruder as defined in claim 7, further comprising a heater disposed around and along an intermediate region of the feed passage between the material feeder and the stationary core.

10. An extruder as defined in claim 7, further comprising a heater disposed along a downstream region of the feed passage between the core and the die.

* * * * *